United States Patent [19]

Enokida et al.

[11] Patent Number: 6,160,053
[45] Date of Patent: Dec. 12, 2000

[54] FLOURINE-CONTAINING COPOLYMER COMPOSITION

[75] Inventors: Takashi Enokida; Okimasa Yamada; Yasunori Yanai; Jun Kanega; Jishan Jin, all of Kitaibaraki, Japan

[73] Assignee: Nippon Medtron, Limited, Japan

[21] Appl. No.: 09/258,472

[22] Filed: Feb. 26, 1999

[30] Foreign Application Priority Data

Mar. 6, 1998 [JP] Japan .................................. 10-073130
Jan. 18, 1999 [JP] Japan .................................. 11-008644

[51] Int. Cl.$^7$ ..................................................... C08L 27/12

[52] U.S. Cl. .......................................... 525/199; 525/200

[58] Field of Search ...................................... 525/199, 200

[56] References Cited

U.S. PATENT DOCUMENTS

| | | | |
|---|---|---|---|
| 4,115,481 | 9/1978 | Finlay et al. | 525/199 |
| 4,713,418 | 12/1987 | Logothetis et al. | 525/200 |
| 5,006,594 | 4/1991 | Rees | 524/520 |
| 5,008,340 | 4/1991 | Guerra et al. | 525/193 |
| 5,109,071 | 4/1992 | Johnson et al. | 525/199 |

*Primary Examiner*—Nathan M. Nutter
*Attorney, Agent, or Firm*—Baker & Daniels

[57] ABSTRACT

A fluorine-containing copolymer composition comprising a fluorine-containing elastomer and a fluororesin, both having reaction sites capable of reacting with a common crosslinking agent gives crosslinking molding products having distinguished roll processability, moldability and mechanical strength, where crosslinking molding is carried out preferably by a peroxide crosslinking system or polyol crosslinking system, and the low temperature characteristics is considerably improved when the fluororesin has a softening point of not less than 120° C.

20 Claims, No Drawings

FLOURINE-CONTAINING COPOLYMER COMPOSITION

BACKGROUND OF THE INVENTION

1. Field of the Invention

The present invention relates to a fluorine-containing copolymer composition, and more particularly to a fluorine-containing copolymer composition comprising a fluorine-containing elastomer and a fluororesin.

2. Related Art

Fluorine-containing elastomers are distinguished in heat resistance, oil resistance, chemical resistance, etc. and their vulcanization molding products are widely used as various seal materials such as oil seals, O-rings, packings, gaskets, etc. However, further improvement is still desired in the following points in spite of even such distinguished characteristics of fluorine-containing elastomers.

(1) Roll Processability:

Generally, most of the fluorine-containing elastomers are not on a satisfactory level with respect to roll processability (windability) and moldability. To solve the problem, JP-B-2-40694 proposes to add a fluorine-containing thermoplastic elastomer to the fluorine-containing elastomer. Nearly satisfactory improvement effect can be obtained thereby. In JP-B-2-40694, the fluorine-containing elastomer and the fluorine-containing thermoplastic elastomer are used in a ratio by weight of the former to the latter of 30:70 (Example 1), 50:50 (Example 2) and 80:20 (Comparative Example 2), and thus the proposed composition can be regarded as a fluorine rubber composition comprising the fluorine-containing thermoplastic elastomer as the major component.

The fluorine-containing thermoplastic elastomer for that purpose is produced by multi-block polymerization (JP-A-53-3495 and JP-B-61-49327), and thus entails a problem of high production cost. The composition range of the disclosed multiblock polymers inevitably gives rise to higher hardness of the crosslinking molding products (in these specification no mention is made of the hardness), limitation of the mixing proportion of a reinforcing filler, etc., thereby restricting the degree of freedom of blend design.

(2) Mechanical Strength:

Generally, the fluorine-containing elastomer has a substantially satisfactory tensile strength (usually strength at break), but its 100% modulus as a strength in the practical service surrounding is not always satisfactory.

SUMMARY OF THE INVENTION

An object of the present invention is to provide a fluorine-containing copolymer composition capable of giving crosslinking molding products having distinguished roll processability, moldability and mechanical strength.

The object of the present invention can be attained by a fluorine-containing copolymer composition comprising a fluorine-containing elastomer and a fluororesin, each having reaction sites for reaction with a common crosslinking agent.

DETAILED DESCRIPTION OF THE INVENTION

Fluorine-containing elastomers for use in the present invention are elastic polymers containing fluorine atoms in the molecule. All the well known fluorine elastomers including copolymers of at least one of monomers selected from the group consisting of vinylidene fluoride (VdF) and tetrafluoroethylene (TFE) with at least one of monomers, capable of making fluorine-containing polymers elastic, selected from the group consisting of hexafluoropropene (HFP), chlorotrifluoroethylene (CTFE), perfluoro(lower alkyl vinyl ether) (FAVE) and propylene (P), can be used.

Specifically, the fluorine-containing elastomers include VdF-HFP copolymer, VdF-TFE-HFP terpolymer, VdF-FAVE copolymer, VdF-TFE-FAVE terpolymer, VdF-CTFE copolymer, VdF-TFE-CTFE terpolymer, TFE-P copolymer, TFE-VdF-P terpolymer, TFE-FAVE copolymer, etc. Perfluoro-(methyl vinyl ether) is preferably used as FAVE. These copolymers or terpolymers, further copolymerized with ethylene, alkyl vinyl ether or the like, can be also used.

The reaction sites introduced into these fluorine-containing elastomer for reaction with a crosslinking agent depend upon which crosslinking system is to be selected. The crosslinking system can be selected from such well known systems as peroxide crosslinking system, polyol crosslinking system, amine crosslinking system, isocyanate crosslinking system, epoxy crosslinking system, etc. It is preferable to use a peroxide crosslinking system or a polyol crosslinking system.

When the peroxide crosslinking system is to be selected, it is necessary that the fluorine-containing elastomers must be combined with such functional groups as iodo groups, bromo groups, peroxy groups, unsaturated groups, etc. From the easiness of introducing the functional groups, it is preferable to select at least one of iodo groups and bromo groups.

Introduction of iodo and bromo groups can be carried out in the coexistence of an iodine and bromine-containing compound represented by the following general formula:

$$InBrmR$$

where R is a fluorohydrocarbon group, a chlorofluorohydrocarbon group, a chlorohydrocarbon group or a hydrocarbon group, each having 1 to 10 carbon atoms, and n and m are each 1 or 2, in the reaction system during the production of the fluorine-containing elastomer by copolymerization reaction. Such an iodine and bromine-compound includes saturated or unsaturated, aliphatic or aromatic compounds, where n and m are each preferably 1.

The linear iodine and bromine-containing compound includes, for example, 1-bromo-2-iodotetrafluoroethane, 1-bromo-3-iodoperfluoropropane, 1-bromo-4-iodoperfluorobutane, 2-bromo-3-iodoperfluorobutane, 1-bromo-2-iodoperfluoro-(2-methylpropane), monobromomonoiodoperfluorocyclobutane, monobromo-monoiodoperfluoropentane, monobromomonoiodoperfluoro-n-octane, mono-bromomonoiodoperiluorocyclohexane, 1-bromo-1-iodo-2-chloroperfluoroethane, 1-bromo-2-iodo-2-chloroperfluoroethane, 1-iodo-2-bromo-2-chloroperfluoroethane, 1,1-dibromo-2-iodoperfluoroethane, 1,2-dibromo-2-iodoperfluoroethane, 1,2-diiodo-2-bromoperfluoroethane, 1-bromo-2-iodo-1,2,2-trifluoroethane, 1-iodo-2-bromo-1,2,2-trifluoroethane, 1-bromo-2-iodo-1,1-difluoroethane, 1-iodo-2-bromo-1,1-difluoroethane, 1-bromo-2-iodo-1-fluoroethane, 1-iodo-2-bromo-1-fluoroethane, 1-bromo-2-iodo-1,1,3,3,3-pentafluoropropane, 1-iodo-2-bromo-1,1,3,3,3-pentafluoropropane, 1-bromo-2-iodo-3,3,4,4,4-pentafluorobutane, 1-iodo-2-bromo-3,3,4,4,4-pentafluorobutane, 1,4-dibromo-2-iodoperfluorobutane, 2,4-dibromo-1-iodoperfluorobutane, 1,4-diiodo-2-bromo-perfluorobutane, 1,4-dibromo-2-iodo-3,3,4,4-tetrafluorobutane, 1,4-diiodo-2-bromo-3,3,4,4-tetrafluorobutane, 1,1-dibromo-2,4-diiodoperfluorobutane, 1-bromo-2-iodo-1-chloroethane, 1-iodo-2-bromo-1-chloroethane, 1-bromo-2-iodo-2-chloroethane, 1-bromo-2-iodo-1,1-dichloroethane, 1,3-dibromo-2-iodoperfluoropropane, 2,3-dibromo-2-iodoperfluoropropane, 1,3-diiodo-2-bromo-perfluoropropane, 1-bromo-2-iodoethane, 1-bromo-2-iodopropane, 1-iodo-2-bromopropane, 1-bromo-2-iodobutane, 1-iodo-2-bromobutane, 1-bromo-2-iodo-2-trifluoromethyl-3,3,3-trifluoropropane, 1-iodo-2-bromo-2-trifluoromethyl-3,3,3-trifluoropropane, 1-bromo-2-iodo-2-phenylperfluoroethane, 1-iodo-2-bromo-2-phenylperfluoroethane, 3-bromo-4-iodoperfluorobutene-1, 3-iodo-4-bromo-perfluorobutene-1, 1-bromo-4-iodoperfluorobutene-1,1-iodo-4-bromoperfluorobutene-1, 3-bromo-4-iodo-3,4,4-trifluorobutene-1, 4-bromo-3-iodo-3,4,4-trifluorobutene-1, 3-bromo-4-iodo-1,1,2-trifluorobutene-1, 4-bromo-5-iodoperfluoropentene-1, 4-iodo-5-bromoperfluoro-pentene-1, 4-bromo-5-iodo-1,1,2-trifluoropentene-1, 4-iodo-5-bromo-1,1 ,2-trifluoropentene-1,1-bromo-2-iodoperfluoroethyl perfluoromethyl ether, 1-bromo-2-iodoperfluoroethyl perfluoroethyl ether, 1-bromo-2-iodo-perfluoroethyl perfluoropropyl ether, 2-bromo-3-iodoperfluoropropyl perfluorovinyl ether, 1-bromo-2-iodoperfluoroethyl perfluorovinyl ether, 1-bromo-2-iodoperfluoroethyl perfluoroallyl ether, 1-bromo-2-iodoperfluoroethyl methyl ether, 1-iodo-2-bromoperfluoroethyl methyl ether, 1-iodo-2-bromoethyl ethyl ether, 1-bromo-2-iodoethyl-2'-chloroethyl ether, etc. These iodine and bromine-containing compounds can be prepared according to an appropriate, known process; for example, a monobromomonoiodo, fluorine-containing olefin can be obtained by allowing a fluorine-containing olefin to react with iodine bromide.

The aromatic, iodine and bromine-containing compound includes, for example, benzenes having a substituent group such as 1-iodo-2-bromo, 1-iodo-3-bromo, 1-iodo-4-bromo, 3,5-dibromo-1-iodo, 3,5-diiodo-1-bromo, 1-(2-iodoethyl)-4-(2-bromoethyl), 1-(2-iodoethyl)-3-(2-bromoethyl), 1-(2-iodoethyl)-4-(2-bromoethyl), 3,5-bis(2-bromoethyl)-1-(2-iodoethyl), 3,5-bis(2-iodoethyl)-1-(2-bromoethyl), 1-(3-iodopropyl)-2-(3-bromopropyl), 1-(3-iodopropyl)-3-(3-bromo-propyl), 1-(3-iodopropyl)-4-(3-bromopropyl), 3,5-bis(3-bromopropyl)-1-(3-iodo-propyl), 1-(4-iodobutyl)-3-(4-bromobutyl), 1-(4-iodobutyl)-4-(4-bromobutyl), 3,5-bis (4-iodobutyl)-1 -(4-bromobutyl), 1-(2-iodoethyl)-3-(3-bromopropyl), 1-(3-iodo-propyl)-3-(4-bromobutyl), 3,5-bis-(3-bromopropyl)-1-(2-iodoethyl), 1-iodo-3-(2-bromoethyl), 1-iodo-3-(3-bromopropyl), 1,3-diiodo-5-(2-bromoethyl), 1,3-diiodo-5-(3-bromopropyl), 1-bromo-3-(2-iodoethyl), 1-bromo-3-(3-iodopropyl), 1,3-dibromo-5-(2-iodoethyl), 1,3-dibromo-5-(3-iodopropyl), etc., and perfluoro-benzenes having a substituent group such as 1-iodo-2-bromo, 1-iodo-3-bromo, 1-iodo-4-bromo, 3,5-dibromo-1-iodo, 3,5-diiodo-1-bromo, etc.

Introduction of the iodo group can be carried out in the coexistence of a saturated or unsaturated iodine-containing compound represented by the following general formula:

RIn where R is a fluorohydrocarbon group, a chlorofluorohydrocarbon group, a chlorohydrocarbon group or a hydrocarbon group, each having 1 to 10 carbon atoms and n is 1 or 2, in the reaction system during the production of the fluorine-containing elastomer by copolymerization reaction.

The saturated iodine-containing compound represented by the foregoing general formula includes, for example, 1,2-diiodoperfluoroethane, 1,3-diiodoperfluoropropane, 1,4-diiodoperfluorobutane, 1,6-diiodoperfluorohexane, 1,8-diiodoperfluorooctane, etc., where 1,4-diiodoperfluorobutane is preferably used. The unsaturated iodine-containing compound includes, for example, iodotrifluoroethylene, 1-iodo-2,2-difluoroethylene, perfluoro(2-iodoethyl vinyl ether), etc.

Introduction of the bromo group can be carried out in the coexistence of a saturated or unsaturated bromine-containing fluorinated compound in the reaction system during the production of the fluorine-containing elastomer by copolymerization reaction. These bromine-containing fluorinated compounds may further contain chlorine atom within the molecular.

Such a bromine-containing fluorinated compound for use in the present invention includes, for example, saturated aliphatic compounds having 2 to 10 carbon atoms such as 1,2-dibromo-1-fluoroethane, 1,2-dibromo-1,1-difluoroethane, 1,2-dibromo-1,1,2-trifluoroethane, 1,2-dibromo-1-chlorotrifluoroethane, 2,3-dibromo-1,1,1-trifluoropropane, 1,2-dibromohexafluoropropane, 1,2-dibromoperfluorobutane, 1,4-dibromoperfluorobutane, 1,4-dibromo-2-chloro-1,1,2-trifluorobutane, 1,6-dibromoperfluorohexane, etc., unsaturated aliphatic compounds such as 2-bromo-1,1-difluoroethylene, 1,1-dibromo-difluoroethylene, bromotrifluoroethylene, 2-bromo-3,3,3-trifluoropropene, 4-bromo-1,1,2-trifluorobutene-1, 4-bromo-3-chloro-3,4,4-trifluorobutene-1, etc., or aromatic compounds such as 1,2-dibromo-3,5-difluorobenzene, 1,2-dibromo-4,5-difluorobenzene, 1,4-dibromo-2,5-difluorobenzene, 2,4-dibromo-1-fluorobenzene, 1,3-dibromo-5-fluorobenzene, 1,4-dibromo-2-fluorobenzene, 1,2-dibromoperfluorobenzene, 1,3-dibromoperfluorobenzene, 1,4-dibromoper-fluorobenzene, etc.

These iodo group and/or bromo group-containing compounds can be used alone or in combination of at least two thereof, and the selection depends on crosslinking conditions for crosslinking molding of a blend comprising the fluorine-containing elastomer and a fluororesin or the reactivities of these compounds.

In case of selecting a polyol crosslinking system, it is necessary that the fluorine-containing elastomer has reaction sites capable of forming intramolecular double bonds by dehydrofluorination reaction. Such reaction sites are —$CF_2$—$CF(CF_3)$—$CH_2$—$CF_2$— [HFP-VdF sequence] bonds, which can form —$CF_2$—$C(CF_3)$=$CH$—$CF_2$— bonds by dehydrofluorination reaction.

Molecular weight of the fluorine-containing elastomer to be used depends on the processability or mechanical properties of the fluorine-containing copolymer composition. Solution viscosity ηsp/c as an index of a molecular weight is desirably about 0.3 to about 1.5 dl/g, preferably about 0.4 to about 1.3 dl/g.

To obtain a fluorine-containing elastomer having a molecular weight corresponding to such a range of solution viscosity, such a chain transfer agent as ethyl malonate, acetone, isopropanol, etc. can be used, if required, during the polymerization reaction, but in case of using an iodine and bromine-containing compound having a chain transfer action per se it is not necessary to use such a chain transfer agent, except for special cases.

Copolymerization for producing a fluorine-containing elastomer can be carried out by any polymerization method such as emulsion polymerization, suspension polymerization, solution polymerization, bulk polymerization, etc. Above all, emulsion polymerization is preferable from the viewpoints of increased degree of polymerization and economy. The emulsion polymerization reaction can be carried out generally at a pressure of about 0 to about 100 Kg/cm² gage, preferably about 10 to about 50 Kg/cm² gage and a temperature of about 0° to about 100° C., preferably about 20° to about 80° C., using a water-soluble inorganic peroxide such as ammonium persulfate, etc. or a redox system comprising the water-soluble inorganic peroxide and a reducing agent as a catalyst, and ammonium perfluorooctanoate, ammonium perfluoroheptanoate, ammonium perfluorononanoate, etc. or their mixture, preferably ammonium perfluorooctanoate as an emulsifier. To adjust the pH within the polymerization system, it may be possible to use an electrolytic substance having a buffering action such as $Na_2HPO_4$, $NaH_2PO_4$, $KH_2PO_4$, etc. or sodium hydroxide.

Fluororesin for blending with the fluorine-containing elastomer is polymers having fluorine atoms within the molecule and a softening point of not less than room temperature, preferably not less than 120° C., particularly preferably not less than 140° C., and further having reaction sites for reaction with the common crosslinking agent to the fluorine-containing elastomer. In case of using fluororesin having a softening point of not less than 120° C., not only the processability and normal state physical properties can be improved, but also the low temperature characteristics, particularly TR-70 value, can be considerably improved.

In case of selecting a polyol crosslinking system, it is necessary, same as in the case of the fluorine-containing elastomer, that the fluororesin has reaction sites capable of undergoing dehydrofluorination in the molecule. VdF-HFP copolymers, VdF-TFE-HFP terpolymers, etc. can be preferably used. In case of e.g. VdF-HFP copolymers, it is desirable from the viewpoint of crosslinking rate that copolymerization proportion of HFP in the copolymer is about 1 to about 10% by mole, preferably about 1 to about 5% by mole.

In case of selecting a peroxide crosslinking system, the degree of freedom of its selection is broadened, and any well known polymer can be used as the fluororesin. For example, polymers having a softening point of not less than room temperature such as TFE homopolymer, TFE-HFP copolymer, TFE-FAVE copolymer, CTFE homopolymer, VdF homopolymer, VF (vinyl fluoride) homopolymer, E(ethylene)-TFE copolymer, E-CTFE copolymer, VdF-HFP copolymer, VdF-TFE-HFP terpolymer, VdF-FAVE copolymer, VdF-CTFE copolymer, etc. can be used.

Introduction of peroxide crosslinkable reaction sites into such a fluororesin having a softening point of not less than room temperature can be carried out in coexistence of at least one of the above-mentioned iodine and bromine-containing compound InBrmR and/or the above-mentioned iodine-containing compound RIn, in the reaction system during the polymerization reaction to produce the fluororesin.

Polymerization reaction to obtain the fluororesin can be carried out preferably by emulsion polymerization, same as in the case of obtaining the fluorine-containing elastomer. Apparent from the solution viscosity $\eta sp/c$ as an index of a molecular weight of the resulting fluororesin being about 0.4 to about 3 dl/g, preferably about 0.7 to about 2.5 dl/g, the adverse effect on the processability is less in spite of high molecular weight than in the case of the fluorine-containing elastomer and it is preferable that the molecular weight is appropriately higher from the viewpoint of mechanical properties.

As will be described later, it is preferable to produce a fluorine-containing copolymer composition by the so called latex blend method of blending an aqueous latex of fluorine-containing elastomer with an aqueous latex of fluororesin.

The fluorine-containing elastomer and the fluororesin are blended together in a ratio of the former to the latter by weight of about 95–about 55%: about 5–about 45%, preferably about 90–about 60% : about 10–about 40%, sum total being 100%. When the fluororesin is blended in a ratio of less than about 5%, the effect of fluorine-containing elastomer on the improvement of physical properties is less, whereas when it is blended in a ratio of more than 45%, the hardness of the crosslinking molding products will be increased, though not so considerable degree as in the above-mentioned case of JP-B-2-40694, and the degree of freedom of blend design will be unpreferably lowered.

Preparation of blends can be carried out by mixing and kneading the fluorine-containing elastomer with the fluororesin, as each isolated in a solid state, by using a mixing roll, a kneader, Banbury mixer, etc., but it is more advantageous to blend an aqueous latex of fluorine-containing elastomer with a latex of fluororesin, both latexes being obtained by emulsion polymerization, in such a blending ratio as to obtain a desired solid proportion, followed by coagulation, washing and drying, because (a) one run each of the coagulation, washing and drying is enough, (b) the blending time is short and (c) dispersibility of fluorine-containing elastomer into the fluororesin can be increased, etc. Coagulation of the aqueous latex blend can be carried out by adding the aqueous latex blend dropwise into an aqueous solution of a salt such as calcium chloride, sodium chloride, potassium alum, etc.

Crosslinking molding of the blend of fluorine-containing elastomer and fluororesin can be carried out by a crosslinking agent corresponding to the type of reaction sites introduced into these two fluorine-containing polymers.

When the fluorine-containing elastomer and the fluororesin each contain iodo groups introduced therein in a proportion of about 0.005 to about 0.050 m moles/g polymer, preferably about 0.01 to about 0.04 m moles/g polymer or bromo groups introduced therein in a proportion of about 0.005 to about 0.050 m moles/g polymer, preferably about 0.01 to about 0.04 m moles/g polymer, together with such a proportion of the iodo groups, an organic peroxide is used as a crosslinking agent.

The organic peroxide for use in the present invention includes, for example, 2,5-dimethyl-2,5-bis(t-butylperoxy)hexane, 2,5-dimethyl-2,5-bis(t-butylperoxy)hexane-3, benzoyl peroxide, bis(2,4-dichlorobenzoyl)peroxide, dicumyl peroxide, di-t-butyl peroxide, t-butylcumyl peroxide, t-butylperoxy-benzene, 1,1-bis(t-butylperoxy)-3,5,5-trimethylchclohexane, 2,5-dimethyl-hexane-2,5-dihydroxyperoxide, α, α'-bis(t-butylperoxy)-p-diisopropyl-benzene, 2,5-dimethyl-2,5-di(benzoylperoxy)hexane, t-butylperoxyisopropyl carbonate, etc.

Together with these organic peroxides, preferably a polyfunctional unsaturated compound such as tri(meth)allyl isocyanulate, trially tri-mellitate, N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc. is used, if required, as a cocrosslinking agent.

The foregoing components to be mixed into the peroxide crosslinking system are used in the following proportions on the basis of 100 parts by weight of the blend, i.e. about 0.1 to about 10 parts by weight, preferably about 0.5 to about 5 parts by weight, of the organic peroxide and about 0.1 to about 10 parts by weight, preferably about 0.5 to about 5 parts by weight, of the cocrosslinking agent.

When a polyol crosslinking system is used for crosslinking molding of the blend, such polyhydroxy aromatic compounds as 2,2-bis(4-hydroxyphenyl)propane [bisphenol A], 2,2-bis(4-hydroxyphenyl)perfluoropropane [bisphenol AF], hydroquinone, catechol, resoranol, 4,4'-dihydroxydiphenyl, 4,4'-dihydroxydiphenylmethane, 4,4'-dihydroxydiphenylsulfone, 2,2-bis(4-hydroxyphenyl) butane, etc., or their alkali metal salts or alkaline earth metal salts are used as a crosslinking agent in a proportion of about 0.5 to about 10 parts by weight, preferably about 1 to about 5 parts by weight, on the basis of 100 parts by weight of the blend.

When the polyhydroxy aromatic compounds (metal salts) are used as a crosslinking agent, various quaternary ammonium salts or quaternary phosphonium salts are preferably used together in a proportion of about 0.1 to about 10 parts by weight, preferably about 0.1 to about 2 parts by weight, on the basis of 100 parts by weight of the blend.

Besides the crosslinking system comprising the foregoing respective components, an acid acceptor such as oxides or hydroxides of divalent metals, e.g. ZnO, CaO, $Ca(OH)_2$, MgO, PbO, etc., synthetic hydrotalcite, etc. is used in a proportion of about 1 to about 20 parts by weight, preferably about 3 to about 15 parts by weight, on the basis of 100 parts by weight of the blend.

Furthermore, the blend may be appropriately admixed with a filler such as carbon black, silica, graphite, clay, talc, diatomaceous earth, barium sulfate, titanium oxide, wollastonite, etc., or a reinforcing agent, a lubricant, a processing aid, a pigment, etc.

The foregoing respective components are kneaded by using a mixing roll, a kneader, Banbury mixer, etc. to prepare a composition. The thus prepared composition is heated at about 150° to about 220° C. for about 0.5 to about 10 minutes by a press molding machine to conduct crosslinking molding, and, if required, is further subjected to secondary crosslinking at about 150° to about 250° C. for about 1 to about 20 hours.

The present fluorine-containing copolymer composition can give crosslinking molding products having distinguished processability and normal state physical properties, by only blending of a fluorine-containing elastomer and a fluororesin each having reaction sites reactable with a common crosslinking agent. In case of using a fluororesin having a softening point of not less than 120° C., the low temperature characteristics, particularly TR-70 value, can be considerably improved at the same time.

Furthermore, the production cost can be much reduced, as compared with methods for improving the physical properties by graft polymerization or block copolymerization.

PREFERRED EMBODIMENTS OF THE INVENTION

The present invention will be further described in detail below, referring to Reference Examples, Examples and Comparative Examples.

REFERENCE EXAMPLE 1

10 g of ammonium perfluorooctanoate, 2 g of sodium hydroxide (for pH adjustment) and 5 L of deionized water were charged into an autoclave (net capacity: 10 L), and the interior space of the autoclave was thoroughly flushed with a nitrogen gas. Then, 14.98 g of 1,4-diiodoperfluorobutane was added thereto under pressure.

Then, a gas mixture consisting of the following components was introduced therein until the inside pressure reached to 20 $Kg/cm^2$ gage, and the inside temperature was elevated to 70° C.

| | |
|---|---|
| Vinylidene fluoride [VdF] | 22 mol. % |
| Tetrafluoroethylene [TFE] | 8 mol. % |
| Hexafluoropropene [HFP] | 70 mol. % |

Then, an aqueous polymerization initiator solution containing 5 g of ammonium persulfate in 150 ml of water was added to the autoclave under pressure to initiate polymerization reaction, where the inside pressure was at 32 $Kg/cm^2$ gage. At each time when the inside pressure was decreased to 29 $Kg/cm^2$ gage, a gas mixture of VdF/HFP/TFE (molar ratio=47:34:19) was introduced therein under pressure as an additional gas until the inside pressure reached 30 $Kg/cm^2$ gage. The introduction of the additional gas was repeated until the solid concentration of the formed latex reached to 25% by weight. When the solid concentration reached to the desired 25% by weight, unreacted gas was immediately purged from the autoclave to discontinue the reaction.

A portion of the resulting aqueous latex was admixed with an aqueous 5 wt. % potassium alum solution to coagulate the formed terpolymer, followed by water washing and drying. 1685 g (polymerization rate: 50%) of the resulting terpolymer fluorine-containing elastomer was measured to determine copolymer composition (by $^{19}$F-NMR), iodine content (by elemental analysis) and solution viscosity ηsp/c [specific viscosity of 1 wt. % solution in methyl ethyl ketone (MEK) at 35° C. ]. Yield is an amount of recovered aqueous latex when the total amount of the aqueous latex is subjected to salting-out, and the polymerization rate is calculated on the basis of yield. The same principle as above is applied to all of the following Reference Examples.

REFERENCE EXAMPLE 2

In Reference Example 1, 10.13 g of 1-bromo-2-iodotetrafluoroethane was used in place of 1,4-diiodoperfluorobutane. The resulting terpolymer fluorine-containing elastomer was measured also to determine the bromine content (by elemental analysis) together with the iodine content.

REFERENCE EXAMPLE 3

In Reference Example 1, 10.0 g of ethyl malonate was used in place of 1,4-diiodoperfluorobutane.

REFERENCE EXAMPLE 4

10 g of ammonium perfluorooctanoate, 2 g of sodium hydroxide and 5 L of deionized water were charged into an autoclave (net capacity: 10 L) and the interior space of the autoclave was thoroughly flushed with a nitrogen gas. Then, 2.0 g of ethyl malonate was added thereto under pressure.

Then, a gas mixture consisting of the following components was introduced therein until the inside pressure reached to 20 $Kg/cm^2$ gage, and the inside temperature was elevated to 80° C.

| | |
|---|---|
| Vinylidene fluoride [VdF] | 70 mol. % |
| Hexafluoropropene [HFP] | 30 mol. % |

Then, an aqueous polymerization initiator solution containing 5 g of ammonium persulfate in 150 ml of water was added to the autoclave under pressure to initiate polymerization reaction, where the inside pressure was 33 Kg/cm² gage. At each time when the inside pressure was decreased to 29 Kg/cm² gage, a gas mixture of VdF/HFP (molar ratio=78:22) was introduced therein under pressure as an additional gas until the inside pressure reached to 30 Kg/cm² gage. The introduction of the additional gas was repeated until the solid concentration of the formed latex reached to 30% by weight. When the solid concentration was reached to the desired 30% by weight, unreacted gas was immediately purged from the autoclave to discontinue the reaction.

A portion of the resulting aqueous latex was admixed with an aqueous 5 wt. % potassium alum solution to coagulate the formed copolymer, followed by water washing and drying. 2188 g (polymerization rate: 85%) of the resulting copolymer fluorine-containing elastomer was measured to determine copolymer composition and solution viscosity ηsp/c as in Reference Example 1.

Copolymer composition, iodine content (and bromine content) and solution viscosity ηsp/c (1% solution in MEK) of the fluorine-containing elastomers obtained in the foregoing Reference Examples 1 to 4 are shown in the following Table 1.

TABLE 1

| Fluorine-containing elastomer | Ref. Ex. 1 | Ref. Ex. 2 | Ref. Ex. 3 | Ref. Ex. 4 |
|---|---|---|---|---|
| [Copolymer composition] | | | | |
| VdF (mol. %) | 54 | 54 | 55 | 78 |
| HFP (mol. %) | 26 | 26 | 27 | 22 |
| TFE (mol. %) | 20 | 20 | 19 | |
| [Iodine and bromine contents] | | | | |
| Iodine content (m mol./g) | 0.033 | 0.015 | | |
| Bromine content (m mol./g) | | 0.016 | | |
| [Solution viscosity] | | | | |
| ηsp/c (dl/g) | 0.58 | 0.75 | 0.96 | 0.90 |

REFERENCE EXAMPLE 5

10 g of ammonium perfluorooctanoate, 2 g of sodium hydroxide and 5 L of deionized water were charged into an autoclave (net capacity: 10 L) and the interior space of the autoclave was thoroughly flushed with a nitrogen gas. Then, 7.65 g of 1,4-diiodoperfluorobutane was added thereto under pressure.

Then, a gas mixture consisting of the following components was introduced therein under pressure until the inside pressure reached to 20 Kg/cm² gage, and the inside temperature was elevated to 70° C.

| Vinylidene fluoride [VdF] | 95 mol. % |
|---|---|
| Chlorotrifluoroethylene [CTFE] | 5 mol. % |

Then, an aqueous polymerization initiator solution containing 5 g of ammonium persulfate in 150 ml of water was added to the autoclave under pressure to initiate polymerization reaction, where the inside pressure was 25 Kg/cm² gage. At each time when the inside pressure was decreased to 20 Kg/cm² gage, a gas mixture of VdF/CTFE (molar ratio=95:5) was introduced therein under pressure as an additional gas until the inside pressure reached to 21 Kg/cm² gage. The introduction of the additional gas was repeated until the solid concentration of the formed latex reached to 25% by weight. When the solid concentration reached to the desired 25% by weight, unreacted gas was immediately purged from the autoclave to discontinue the reaction.

A portion of the resulting aqueous latex was admixed with an aqueous 5 wt. % potassium alum solution to coagulate the formed copolymer, followed by water washing and drying. 1680 g (polymerization rate: 80%) of the resulting copolymer fluororesin was measured to determine copolymer composition (by ¹⁹F-NMR), iodine content (by elemental analysis) and solution viscosity ηsp/c [specific viscosity of 1 wt. % solution in dimethyl-formamide (DMF) at 35° C.], together with determination of melting point (by DSC method).

REFERENCE EXAMPLE 6

In Reference Example 5, 5.17 g of 1-bromo-2-iodotetrafluoroethane was used in place of 1,4-diiodoperfluorobutane.

REFERENCE EXAMPLE 7

In Reference Example 6, 5.0 g of ethyl malonate was used in place of 1-bromo-2-iodotetrafluoroethane.

REFERENCE EXAMPLE 8

20 g of ammonium perfluorooctanoate, 2 g of sodium hydroxide and 6 L of deionized water were charged into an autoclave (net capacity: 10 L), and the interior space of the autoclave was flushed with a nitrogen gas.

Then, a gas mixture consisting of the following components was introduced therein under pressure until the inside pressure reached to 24 Kg/cm² gage. Then, 10.0 g of ethyl malonate was added thereto under pressure. By elevating the inside temperature to 80° C., the inside pressure was increased to 37 Kg/cm² gage.

| Vinylidene fluoride [VdF] | 83.1 mol. % |
|---|---|
| Tetrafluoroethylene [TFE] | 5.9 mol. % |
| Hexafluoropropene [HFP] | 11.0 mol. % |

Then, an aqueous polymerization initiator solution containing 5 g of ammonium persulfate in 150 ml of water was added to the autoclave under pressure to initiate polymerization reaction. At each time when the inside pressure was decreased to 29 Kg/cm² gage, a gas mixture of VdF/TFE/HFP in a molar ratio of 87.6/6.2/6.2 was introduced therein under pressure as an additional gas until the inside pressure reached to 30 Kg/cm² gage. The introduction of additional gas was repeatedly carried out until the solid concentration of aqueous dispersion resulting from the polymerization reached to 30% by weight. Immediately thereafter, unreacted gas was purged from the autoclave, followed by quenching of the autoclave to discontinue the polymerization reaction.

A portion of the resulting aqueous latex was admixed with an aqueous 5 wt. % potassium alum solution to coagulate the formed terpolymer, followed by water washing and drying. Solution viscosity ηsp/c of 2,600 g (polymerization rate: 75%) of the resulting terpolymer fluororesin was determined as specific viscosity of 1 wt. % solution in methyl ethyl ketone MEK).

REFERENCE EXAMPLE 9

In Reference Example 4, the composition of the gas mixture to be introduced to the autoclave before the initiation of polymerization reaction was changed to VdF/HFP= 85/15 (mol. %), and the composition of the additional gas to be introduced to the autoclave during the polymerization reaction was changed to VdF/HFP=91/9 (mol. %). Furthermore, the polymerization reaction temperature was changed to 50° C. Determination of solution viscosity ηsp/c was made as a 1 wt. % solution in dimethylformamide.

REFERENCE EXAMPLE 10

In Reference Example 4, the composition of the gas mixture to be introduced to the autoclave before the initiation of polymerization reaction was changed to VdF/HFP= 90/10 (mol. %), and the composition of the additional gas to be introduced to the autoclave during the polymerization reaction was changed to VdF/HFP=96/4 (mol. %). Furthermore, the polymerization reaction temperature was changed to 50° C. Determination of solution viscosity ηsp/c was made as a 1 wt. % solution in dimethylformamide.

REFERENCE EXAMPLE 11

In Reference Example 4, the composition of the gas mixture to be introduced to the autoclave before the initiation of polymerization reaction was changed to VdF/HFP= 92/8 (mol. %), and the composition of the additional gas to be introduced to the autoclave during the polymerization reaction was changed to VdF/HFP=97/3 (mol. %). Furthermore, the polymerization reaction temperature was changed to 50° C. Determination of solution viscosity ηsp/c was made as a 1 wt. % solution in dimethylformamide.

Copolymer composition, iodine content (and bromine content), solution viscosity ηsp/c (1% solution in DMF or MEK) and melting point of fluororesins obtained in the foregoing Reference Examples 5 to 11 are shown in the following Table 2.

The following formulation components were roll kneaded:

| | |
|---|---|
| Fluorine-containing copolymer composition A | 100 parts by weight |
| MT carbon black | 20 " |
| Zinc oxide | 6 " |
| 2,5-dimethyl-2,5-di(t-butylperoxy)hexane | 0.5 " |
| Triallyl isocyanurate | 4 " |

The kneading product was subjected to press crosslinking at 180° C. for 5 minutes and oven crosslinking at 200° C. for 4 hours to conduct crosslinking molding for sheets and O-rings. The resulting crosslinking molding products measured tested to determine the following properties:

(1) Processability:

(a) Roll processability  ◯: Good windability
 Δ: Appearance of cracks on edges of wound body
 X: Poor windability
(b) Moldability  ◯: Good mold releasability with smooth surface of molding product
 Δ: Relatively good mold releasability with partly less smooth surface of molding product
 X: Loss of original shape of mold-released molding product (2) Normal state physical properties:

(a) Hardness (shore A) according to ASTM D-2240-81
(b) 100% modulus according to ASTM D-412-83
(c) Tensile strength according to ASTM D-412-83
(d) Elongation according to ASTM D-412-83

TABLE 2

| | Reference Example No. | | | | | | |
|---|---|---|---|---|---|---|---|
| Fluororesin | 5 | 6 | 7 | 8 | 9 | 10 | 11 |
| [Copolymer composition] | | | | | | | |
| VdF (mol. %) | 92 | 92 | 92 | 88 | 91 | 96 | 97 |
| TFE (mol. %) | | | | 6 | | | |
| HFP (mol %) | | | | 6 | 9 | 4 | 3 |
| CTFE (mol. %) | 8 | 8 | 8 | | | | |
| [Iodine and bromine contents] | | | | | | | |
| Iodine content (m mol./g) | 0.020 | 0.011 | | | | | |
| Bromine content (m mol./g) | | 0.010 | | | | | |
| [Solution viscosity] | | | | | | | |
| ηsp/c (dl/g) | 1.50 | 2.00 | 1.98 | 0.95 | 1.40 | 1.48 | 1.51 |
| [Melting point] | | | | | | | |
| DSC method (° C.) | 151 | 155 | 153 | 111 | 110 | 147 | 152 |

EXAMPLE 1

The aqueous latex of fluorine-containing elastomer obtained in Reference Example 1 and the aqueous latex of fluororesin obtained in Reference Example 5 were mixed together in such a proportion as to make a ratio by weight of the former to the latter of 85/15 (solid basis) with stirring. The resulting aqueous latex blend was added to an aqueous 5 wt. % potassium alum solution to effect coagulation. After water washing and drying, fluorine-containing copolymer composition A was obtained.

EXAMPLE 2

In Example 1, the ratio by weight (solid basis) was changed to 70/30.

COMPARATIVE EXAMPLE 1

The fluorine-containing elastomer obtained from the aqueous latex obtained in Reference Example 1 was subjected to the same formulation, kneading, crosslinking and determination as in Example 1.

EXAMPLE 3

The aqueous latex of fluorine-containing elastomer obtained in Reference Example 2 and the aqueous latex of fluororesin obtained in Reference Example 6 were blended together in such a proportion as to make a ratio by weight of the former to the latter of 85/15 (solid basis) with stirring. The resulting aqueous latex blend was added to an aqueous 5 wt. % potassium alum solution to conduct coagulation. After water washing and drying, a fluorine-containing copolymer composition B was obtained.

The following formulation components were roll kneaded:

| | |
|---|---|
| Fluorine-containing copolymer composition B | 100 parts by weight |
| 2,5-dimethyl-2,5-di(t-butylperoxy)hexane | 1.1 " |
| Triallyl isocyanurate | 3.6 " |

The kneading product was subjected to press crosslinking at 180° C. for 10 minutes and oven crosslinking at 200° C. for 20 hours to conduct crosslinking molding for sheets and O-rings. The resulting crosslinking molding products were tested to evaluate the processability, and determine the normal state physical properties and compression set.

EXAMPLE 4

The fluorine-containing elastomer obtained from the aqueous latex of Reference Example 2 and the fluororesin obtained from the aqueous latex of Reference 6 were roll kneaded together in a ratio by weight of the former to the latter of 85/15 to obtain a fluorine-containing copolymer composition C. The resulting fluorine-containing copolymer composition C was subjected to the same formulation, kneading, crosslinking and determination as in Example 3.

COMPARATIVE EXAMPLE 2

The fluorine-containing elastomer obtained from the aqueous latex of Reference Example 2 was subjected to the same formulation, kneading, crosslinking and determination as in Example 3.

COMPARATIVE EXAMPLE 3

In Example 3, the aqueous latex of fluororesin obtained in Reference Example 7 was used in place of the aqueous latex of fluororesin obtained in Reference Example 6 to obtain a fluorine-containing copolymer composition D. The resulting fluorine-containing copolymer composition D was subjected to the same formulation, kneading and crosslinking as in Example 3, but no molding products capable of testing to evaluate physical properties were obtained.

EXAMPLE 5

The aqueous latex of fluorine-containing elastomer obtained in Reference Example 3 and the aqueous latex of fluororesin obtained in Reference Example 8 were blended together in such a proportion as to make a ratio by weight of the former to the latter of 85/15 (solid basis) with stirring. The resulting aqueous latex blend was added to an aqueous 5 wt. % potassium alum solution to conduct coagulation. After water washing and drying, a fluorine-containing copolymer composition E was obtained.

The following formulation components were roll kneaded together:

| | |
|---|---|
| Fluorine-containing copolymer composition E | 100 parts by weight |
| MT carbon black | 30 " |
| Calcium hydroxide | 5 " |
| Magnesium hydroxide | 3 " |
| Bisphenol AF master batch (50 wt. %) | 4 " |
| Benzyltriphenylphosphonium chloride master batch (35 wt. %) | 1.5 " |

The kneading product was subjected to press crosslinking at 180° C. for 10 minutes and oven crosslinking at 230° C. for 20 hours to conduct crosslinking molding for sheets and O-rings. The resulting crosslinking molding products were measured to determine the processability, normal state physical properties and compression set. The above-mentioned two master batches were used as master batches for fluorine-containing elastomer having a copolymer composition of VdF-HFP (molar ratio: 75:25) and a $\eta sp/c$ value of 1.0 dl/g (1 wt. % solution in MEK at 35° C.).

COMPARATIVE EXAMPLE 4

The fluorine-containing elastomer obtained from the aqueous latex of Reference Example 3 was subjected to the same formulation, kneading, crosslinking and determination as in Example 5.

COMPARATIVE EXAMPLE 5

In Example 5, the aqueous latex of fluororesin obtained in Reference Example 7 was used in place of the aqueous latex of fluororesin obtained in Reference Example 8 to obtain a fluorine-containing copolymer composition F. The resulting fluorine-containing copolymer composition F was subjected to the same formulation, kneading and crosslinking, but no molding products capable of testing to determine physical properties were obtained.

Results of determination in the foregoing Examples 1 to 5 and Comparative Examples 1, 2 and 4 are shown in the following Table 3.

TABLE 3

| Test Item | Ex. 1 | Ex. 2 | Comp. Ex. 1 | Ex. 3 | Ex. 4 | Comp. Ex. 2 | Ex. 5 | Comp. Ex. 4 |
|---|---|---|---|---|---|---|---|---|
| [Processability] | | | | | | | | |
| Roll processability | ○ | ○ | Δ | ○ | ○ | x | ○ | Δ |
| Moldability | ○ | ○ | Δ | ○ | ○ | Δ | ○ | ○ |
| [Normal state physical properties] | | | | | | | | |

TABLE 3-continued

| Test Item | Ex. 1 | Ex. 2 | Comp. Ex. 1 | Ex. 3 | Ex. 4 | Comp. Ex. 2 | Ex. 5 | Comp. Ex. 4 |
|---|---|---|---|---|---|---|---|---|
| Hardness (Shore A) | 75 | 79 | 70 | 64 | 65 | 52 | 73 | 68 |
| 100% Modulus (MPa) | 6.9 | 9.8 | 3.8 | 2.5 | 2.2 | 1.2 | 6.9 | 4.0 |
| Tensile strength (MPa) | 19.0 | 20.1 | 17.7 | 13.1 | 12.9 | 11.4 | 18.8 | 16.8 |
| Elongation (%) | 350 | 350 | 350 | 390 | 380 | 470 | 310 | 320 |
| [Compression set] | | | | | | | | |
| 200° C. for 70 hours (%) | 39 | 37 | 38 | 41 | 44 | 43 | 28 | 29 |

As to the present fluorine-containing copolymer compositions the following can be concluded from the foregoing results:

(1) By blending a fluorine-containing elastomer with a fluororesin having reaction sites capable of reacting with a common crosslinking agent to the former, 100% modulus and tensile strength can be improved without any decrease in elongation (see Examples 1 and 2 vs. Comparative Example 1, Example 3 vs. Comparative Example 2 and Example 5 vs. Comparative Example 4).

(2) Without any reaction sites capable of reacting with the common crosslinking agent, on the other hand, it is difficult to obtain crosslinking molding products (see Example 3 vs. Comparative Example 3 and Example 5 vs. Comparative Example 5).

(3) Roll processability and moldability of fluorine-containing elastomer can be improved. No external heating is required during the kneading (see Example 1 and 2 vs. Comparative Example 1, Example 3 vs. Comparative Example 2 and Example 5 vs. Comparative Example 4).

EXAMPLE 6

The aqueous latex of fluorine-containing elastomer obtained in Reference Example 4 and the aqueous latex of fluororesin obtained in Reference Example 10 were blended together in such a proportion as to make a ratio by weight of the former to the latter of 85/15 (solid basis) with stirring. The resulting aqueous latex blend was added to an aqueous 5 wt. % potassium alum solution to conduct coagulation. After water washing and drying, a fluorine-containing copolymer composition G was obtained.

The following formulation components were roll kneaded:

| | |
|---|---|
| Fluorine-containing copolymer composition G | 100 parts by weight |
| MT carbon black | 30 " |
| Calcium hydroxide | 5 " |
| Magnesium hydroxide | 3 " |
| Bisphenol AF master batch (50 wt. %) | 4 " |
| Benzyltriphenylphosphonium chloride master batch (35 wt. %) | 1.5 " |

The kneading product was subjected to press crosslinking at 180° C. for 10 minutes and oven crosslinking at 230°C. for 20 hours to conduct crosslinking molding for sheets and O-rings. The crosslinking molding products were measured to determine crosslinking characteristics, processability, normal state physical properties, low temperature characteristics and compression set. The above-mentioned two master batches were used as master batches of fluorine-containing elastomer of Reference Example 4.

(1) Crosslinking Characteristics:

By conducting crosslinking at 180° C. for 10 minutes, minimum torque ($M_L$), maximum torque ($M_H$) and time required for reaching 90% maximum torque (tc 90) were measured with an oscillating disc meter, model ASTM-100, available from Toyo Seiki K.K., Japan (2) Low Temperature Characteristics:

TR-10 value and TR-70 value were measured, and a difference there between was calculated according to ASTM D-1329

EXAMPLE 7

In Examples 6, the aqueous latex of fluororesin obtained in Reference Example 11 was used in place of the aqueous latex of fluororesin obtained in Reference Example 10.

EXAMPLE 8

In Example 6, the aqueous latex of fluororesin obtained in Reference Example 9 was used in place of the aqueous latex of fluororesin obtained in Reference Example 10.

EXAMPLE 9

In Example 6, the aqueous latex of fluororesin obtained in Reference Example 5 was used in place of the aqueous latex of fluororesin obtained in Reference Example 10.

EXAMPLE 10

The crosslinking molding products obtained in Example 1 were tested to determine crosslinking characteristics and low temperature characteristics in the same manner as in Example 6. Determinations are shown in the following Table 4 together with determinations of other test items (see Table 3).

COMPARATIVE EXAMPLE 6

In Example 1, the aqueous latex of fluorocarbon obtained in Reference Example 11 was used in place of the aqueous latex of fluororesin obtained in Reference Example 5, and formulation, kneading, crosslinking and determination were carried out in the same manner as in Example 6.

COMPARATIVE EXAMPLE 7

The fluorine-containing elastomer obtained from the aqueous latex of Reference Example 4 was subjected to the same formulation, kneading, crosslinking and determination as in Example 6.

COMPARATIVE EXAMPLE 8

The fluorine-containing elastomer obtained from the aqueous latex of Reference Example 1 was subjected to the same formulation, kneading, crosslinking and determination as in Example 6. Some of determinations are shown in Table 3 as Comparative Example 1.

Results of determination of Examples 6 to 10 and Comparative Examples 6 to 8 are shown in the following Table 4.

TABLE 4

| Test Item | Ex. No. | | | | | Comp. Ex. No. | | |
|---|---|---|---|---|---|---|---|---|
| | 6 | 7 | 8 | 9 | 10 | 6 | 7 | 8 |
| [Processability] | | | | | | | | |
| Roll processability | ○ | ○ | ○ | ○ | ○ | ○ | Δ | Δ |
| Moldability | ○ | ○ | ○ | Δ | ○ | Δ | ○ | Δ |
| [Crosslinking characteristics] | | | | | | | | |
| $M_L$ (dN·m) | 1.4 | 1.6 | 1.5 | 1.3 | 0.9 | 0.7 | 1.4 | 0.7 |
| $M_H$ (dN·m) | 21.8 | 21.0 | 22.2 | 19.8 | 23.4 | 21.9 | 22.4 | 23.4 |
| tc90 (min.) | 2.20 | 3.44 | 1.98 | 2.90 | 1.43 | 1.88 | 1.82 | 1.58 |
| [Normal state physical properties] | | | | | | | | |
| Hardness (Shore A) | 77 | 79 | 75 | 80 | 75 | 75 | 72 | 70 |
| 100% Modulus (MPa) | 8.3 | 8.8 | 7.0 | 6.8 | 6.9 | 5.0 | 5.2 | 3.8 |
| Tensile strength (MPa) | 16.5 | 16.7 | 15.0 | 15.5 | 19.0 | 18.0 | 14.8 | 17.7 |
| Elongation (%) | 220 | 230 | 230 | 220 | 350 | 350 | 220 | 350 |
| [Low temperature characteristics] | | | | | | | | |
| TR-10 (°C.) | −17.0 | −17.7 | −16.6 | −17.6 | −8.0 | −7.8 | −17.9 | −7.9 |
| TR-70 (°C.) | −5.0 | −7.0 | −2.1 | −0.3 | −2.7 | +2.2 | −7.0 | −2.9 |
| [TR-70]-[TR-10] (°C.) | 12.0 | 10.7 | 14.5 | 17.3 | 5.3 | 10.0 | 10.9 | 5.0 |
| [Compression set] | | | | | | | | |
| 150° C. for 70 hours (%) | 10 | 10 | 15 | 20 | 26 | 37 | 10 | 25 |
| 200° C. for 70 hours (%) | 12 | 15 | 15 | 17 | 39 | 43 | 15 | 38 |

The following can be concluded from the foregoing results:

(1) Polyol Crosslinking System:

In cases of using fluororesins having a higher melting point e.g. Example 6 (Tm: 147° C.) and Example 7 (Tm: 152° C.) than that of the fluororesin, e.g. Example 8 (Tm: 110° C.), the low temperature characteristics, particularly TR-70 value, are improved. Degree of improvement increases with increasing melting point of fluororesin.

Furthermore, in contrast to using VdF-CTFE copolymer having a high melting point but a poor polyol crosslinkability as a fluororesin, VdF-HFP copolymer resin is distinguished in moldability and low temperature characteristics (TR-70 value).

(2) Peroxide Crosslinking System:

Comparison of Example 10 (Tm: 151° C.) with Comparative Example 6 (Tm: 152° C.) using fluororesins having substantially same melting points reveals that the former having peroxide crosslinking sites is distinguished in low temperature characteristics (TR-70 value) than the latter having no such crosslinking sites, and also distinguished in the moldability and compression set characteristics.

What is claimed is:

1. A fluorine-containing copolymer composition, which comprises a fluorine-containing elastomer and a fluororesin, both having reaction sites comprising at least one of iodo groups and bromo groups, capable of reacting with a peroxide-based crosslinking agent.

2. A fluorine-containing copolymer composition according to claim 1, wherein the fluorine-containing elastomer having reaction sites capable of reacting with a common crosslinking agent is a copolymer comprising at least one monomer selected from the group consisting of vinylidene fluoride and tetrafluoroethylene, and at least one monomer selected from the group consisting of hexafluoropropene, chlorotrifluoroethylene and perfluoro(lower alkyl vinyl ether) having a lower alkyl group with 1 to 3 carbon atoms.

3. A fluorine-containing copolymer composition according to claim 2, wherein the fluorine-containing elastomer is a terpolymer of vinylidene fluoride-hexafluoropropene-tetrafluoroethylene.

4. A fluorine-containing copolymer composition according to claim 2, wherein the fluorine-containing elastomer is a copolymer of vinylidene fluoride-hexafluoropropene.

5. A fluorine-containing copolymer composition according to claim 1, wherein the fluororesin having reaction sites capable of reacting with a common crosslinking agent is a copolymer comprising at least one monomer selected from the group consisting of vinylidene fluoride and tetrafluoroethylene, and at least one monomer selected from the group consisting of hexafluoropropene, chlorotrifluoroethylene and perfluoro(lower alkyl vinyl ether) having a lower alkyl group with 1 to 3 carbon atoms.

6. A fluorine-containing copolymer composition according to claim 5, wherein the fluororesin is a copolymer of vinylidene fluoride-chlorotrifluoroethylene.

7. A fluorine-containing copolymer composition according to claim 5, wherein the fluororesin is a terpolymer of vinylidene fluoride-hexafluoropropene-tetrafluoroethylene.

8. A fluorine-containing copolymer composition according to claim 5, wherein the fluororesin is a copolymer of vinylidene fluoride-hexafluoropropene.

9. A fluorine-containing copolymer composition according to claim 5, wherein the fluororesin has a softening point of not less than 120° C.

10. A fluorine-containing copolymer composition according to claim 1, wherein the composition is prepared by blending an aqueous latex of the fluorine-containing elastomer with an aqueous latex of the fluororesin, followed by coagulation.

11. A fluorine-containing copolymer composition according to claim 1, wherein the composition is prepared by dry blending the fluorine-containing elastomer with the fluororesin.

12. A seal made from the fluorine-containing copolymer composition of claim 1.

13. A fluorine-containing copolymer composition, which comprises a fluorine-containing elastomer and a fluororesin, both having reaction sites comprising hexafluoropropene-vinylidene bonds capable of forming intramolecular double bonds by dehydrofluorination, which intramolecular double bonds are capable of reacting with a polyol-based crosslinking agent.

14. A fluorine-containing copolymer composition according to claim 13, wherein the fluorine-containing elastomer is a terpolymer of vinylidene fluoride-hexafluorpropene-tetrafluoroethylene.

15. A fluorine-containing copolymer composition according to claim 13, wherein the fluorine-containing elastomer is a copolymer of vinylidene fluoride-hexafloropropene.

16. A fluorine-containing copolymer composition according to claim 13, wherein the fluororesin is a terpolymer of vinylidene fluoride-hexafluorpropene-tetrafluoroethylene.

17. A fluorine-containing copolymer composition according to claim 13, wherein the fluororesin is a copolymer of vinylidene fluoride-hexafloropropene.

18. A fluorine-containing copolymer composition according to claim 13, wherein the fluororesin has a softening point of 120° C. or greater.

19. A fluorine-containing copolymer composition according to claim 13, wherein the composition is prepared by blending an aqueous latex of the fluorine-containing elastomer with an aqueous latex of the fluororesin, followed by coagulation.

20. A fluorine-containing copolymer composition according to claim 13, wherein the composition is prepared by dry blending the fluorine-containing elastomer with the fluororesin.

* * * * *

UNITED STATES PATENT AND TRADEMARK OFFICE
CERTIFICATE OF CORRECTION

PATENT NO. : 6,160,053
DATED : December 12, 2000
INVENTOR(S) : Takashi Enokida et al.

It is certified that error appears in the above-identified patent and that said Letters Patent are hereby corrected as shown below:

In the title, please change "FLOURINE" to --FLUORINE--

Signed and Sealed this

Twenty-ninth Day of May, 2001

Attest:

NICHOLAS P. GODICI

*Attesting Officer*    *Acting Director of the United States Patent and Trademark Office*